US011278980B2

(12) United States Patent
Mehn et al.

(10) Patent No.: US 11,278,980 B2
(45) Date of Patent: Mar. 22, 2022

(54) WELDING SYSTEM WITH MULTIPLE USER INTERFACE MODULES

(71) Applicant: Illinois Tool Works Inc., Glenview, IL (US)

(72) Inventors: Peter Donald Mehn, Oshkosh, WI (US); Andrew David Nelson, Grand Chute, WI (US); Randy Alan DeCoster, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 294 days.

(21) Appl. No.: 16/182,108

(22) Filed: Nov. 6, 2018

(65) Prior Publication Data
US 2019/0070688 A1 Mar. 7, 2019

Related U.S. Application Data

(63) Continuation of application No. 13/828,728, filed on Mar. 14, 2013, now Pat. No. 10,118,241.
(Continued)

(51) Int. Cl.
*B23K 9/09* (2006.01)
*B23K 9/095* (2006.01)
(Continued)

(52) U.S. Cl.
CPC .......... *B23K 9/0953* (2013.01); *B23K 9/1087* (2013.01); *G09G 5/12* (2013.01); *H04N 21/4126* (2013.01)

(58) Field of Classification Search
CPC ........ B23K 9/095; B23K 9/0953; B23K 9/10; B23K 9/1087; B23K 9/1006; B23K 11/36; B23K 9/1012; H04N 21/4126
See application file for complete search history.

(56) References Cited

U.S. PATENT DOCUMENTS

| | | | |
|---|---|---|---|
| 2,043,331 | A | 6/1936 | Notvest |
| 2,175,891 | A | 10/1939 | Graham |
| 2,526,597 | A | 10/1950 | Winslow |
| 2,617,913 | A | 11/1952 | Oestreicher |

(Continued)

FOREIGN PATENT DOCUMENTS

| | | |
|---|---|---|
| CN | 1538306 | 10/2004 |
| CN | 1746833 | 3/2006 |

(Continued)

OTHER PUBLICATIONS

"Miller PC-300 Owner's Manual", Aug. 1989 (Aug. 1989), http://igor.chudov.com/manuals/Miller/Miller-PC-300-Pulse-Control_Manual.pdf.

(Continued)

*Primary Examiner* — Brian W Jennison
(74) *Attorney, Agent, or Firm* — McAndrews, Held & Malloy, Ltd.

(57) ABSTRACT

A welding system user interface module includes a front panel comprising a first input device and a first display screen. The welding system user interface module also includes circuitry comprising a memory storing machine-readable instructions, a processor for executing the machine-readable instructions, and communication circuitry configured to receive UI data from the first input device or a second input device of a remote welding system user interface module, and to broadcast synchronized data to the first display screen and a second display screen of the remote welding system user interface module.

8 Claims, 5 Drawing Sheets

Related U.S. Application Data

(60) Provisional application No. 61/697,993, filed on Sep. 7, 2012.

(51) Int. Cl.
  *G09G 5/12* (2006.01)
  *H04N 21/41* (2011.01)
  *B23K 9/10* (2006.01)

(56) References Cited

U.S. PATENT DOCUMENTS

| | | | |
|---|---|---|---|
| 2,642,515 A | 6/1953 | Bagg | |
| 3,567,902 A | 3/1971 | Stearns | |
| 3,992,565 A | 11/1976 | Gatfield | |
| 4,051,344 A | 9/1977 | Robbins | |
| 4,079,231 A | 3/1978 | Toth | |
| 4,147,919 A | 4/1979 | Matasovic | |
| 4,216,367 A | 8/1980 | Risberg | |
| 4,216,368 A | 8/1980 | Delay | |
| 4,227,066 A | 10/1980 | Bulwidas | |
| 4,247,752 A | 1/1981 | Stringer | |
| 4,266,114 A | 5/1981 | Hansen | |
| 4,410,789 A | 10/1983 | Story | |
| 4,450,340 A | 5/1984 | Corrigall | |
| 4,467,174 A | 8/1984 | Gilliland | |
| 4,508,954 A | 4/1985 | Kroll | |
| 4,521,572 A | 6/1985 | Cuscurida | |
| 4,521,672 A | 6/1985 | Fronius | |
| 4,531,045 A | 7/1985 | Kemp | |
| 4,561,059 A | 12/1985 | Davis | |
| 4,584,685 A | 4/1986 | Gajjar | |
| 4,641,292 A | 2/1987 | Tunnell | |
| 4,716,274 A | 12/1987 | Gilliland | |
| 4,767,908 A | 8/1988 | Dallavalle | |
| 5,025,500 A | 6/1991 | Phinney | |
| 5,039,635 A | 8/1991 | Stempin | |
| 5,039,835 A | 8/1991 | Schwiete | |
| 5,043,557 A | 8/1991 | Tabata | |
| 5,136,139 A | 8/1992 | Gilliland | |
| 5,276,305 A | 1/1994 | Hsien | |
| 5,376,894 A | 12/1994 | Petranovich | |
| 5,406,050 A | 4/1995 | Macomber | |
| 5,426,426 A | 6/1995 | Hymel | |
| 5,653,902 A | 8/1997 | Chang | |
| 5,708,253 A | 1/1998 | Bloch | |
| 5,731,799 A | 3/1998 | Kee | |
| 5,982,253 A | 11/1999 | Perrin | |
| 6,040,555 A | 3/2000 | Tiller | |
| 6,040,829 A | 3/2000 | Croy | |
| 6,087,622 A | 7/2000 | Summers | |
| 6,103,994 A | 8/2000 | Decoster | |
| 6,156,999 A | 12/2000 | Ignatchenko | |
| 6,247,058 B1 * | 6/2001 | Miller | H04L 47/10 |
| | | | 370/418 |
| 6,365,868 B1 | 4/2002 | Borowy | |
| 6,417,995 B1 | 7/2002 | Wu | |
| 6,423,936 B1 | 7/2002 | Reed | |
| 6,458,157 B1 | 10/2002 | Suaning | |
| 6,531,673 B2 | 3/2003 | Fedorcak | |
| 6,570,132 B1 | 5/2003 | Brunner | |
| 6,624,388 B1 | 9/2003 | Blankenship et al. | |
| 6,734,393 B1 | 5/2004 | Friedl | |
| 6,781,095 B2 | 8/2004 | Hayes | |
| 6,841,752 B2 | 1/2005 | Ward | |
| 6,906,285 B2 | 6/2005 | Zucker | |
| 6,909,285 B2 | 6/2005 | Jordan | |
| 7,038,167 B2 | 5/2006 | Hayes | |
| 7,041,936 B2 | 5/2006 | Oberzaucher | |
| 7,045,742 B2 | 5/2006 | Feichtinger | |
| 7,049,547 B1 | 5/2006 | Brunner et al. | |
| 7,180,029 B2 | 2/2007 | Ott | |
| 7,205,503 B2 | 4/2007 | Reynolds | |
| 7,220,941 B2 | 5/2007 | Niedereder et al. | |
| 7,245,875 B2 | 7/2007 | Clark | |
| 7,257,465 B2 | 8/2007 | Perez | |
| 7,307,241 B2 | 12/2007 | Hayes | |
| 7,336,259 B2 | 2/2008 | Li | |
| 7,342,210 B2 | 3/2008 | Fergason | |
| 7,363,137 B2 | 4/2008 | Brant | |
| 7,375,304 B2 | 5/2008 | Kainec | |
| 7,574,172 B2 | 8/2009 | Clark | |
| 7,810,937 B2 | 10/2010 | Garbergs | |
| 7,873,495 B2 | 1/2011 | Lindell | |
| 7,979,162 B2 | 7/2011 | Niemela | |
| 2001/0043656 A1 | 11/2001 | Koslar | |
| 2002/0099774 A1 | 7/2002 | Yamato | |
| 2003/0184515 A1 | 10/2003 | Tsai | |
| 2004/0199846 A1 | 10/2004 | Matsumoto | |
| 2004/0232128 A1 | 11/2004 | Niedereder | |
| 2004/0260407 A1 | 12/2004 | Wimsatt | |
| 2005/0016975 A1 | 1/2005 | Reynolds | |
| 2005/0017152 A1 | 1/2005 | Fergason | |
| 2005/0155068 A1 | 7/2005 | Chang | |
| 2005/0230372 A1 | 10/2005 | Ott | |
| 2005/0263513 A1 | 12/2005 | Leisner | |
| 2005/0289264 A1 * | 12/2005 | Illowsky | G06F 8/41 |
| | | | 710/104 |
| 2006/0077046 A1 | 4/2006 | Endo | |
| 2006/0138113 A1 | 6/2006 | Ott | |
| 2006/0163227 A1 | 7/2006 | Hillen | |
| 2006/0213892 A1 | 9/2006 | Ott | |
| 2006/0276288 A1 | 12/2006 | Iwanaka | |
| 2007/0051711 A1 * | 3/2007 | Kachline | B23K 9/28 |
| | | | 219/130.01 |
| 2007/0080149 A1 | 4/2007 | Albrecht | |
| 2007/0080150 A1 | 4/2007 | Albrecht | |
| 2007/0080151 A1 | 4/2007 | Albrecht et al. | |
| 2007/0080152 A1 | 4/2007 | Albrecht | |
| 2007/0080153 A1 | 4/2007 | Albrecht | |
| 2007/0114216 A1 | 5/2007 | Ott | |
| 2008/0003997 A1 | 1/2008 | Parkkinen | |
| 2008/0061049 A1 | 3/2008 | Albrecht | |
| 2008/0116185 A1 | 5/2008 | Luck et al. | |
| 2008/0116186 A1 | 5/2008 | Luck et al. | |
| 2008/0149611 A1 | 6/2008 | Roth | |
| 2009/0039064 A1 | 2/2009 | Enyedy | |
| 2009/0200283 A1 | 8/2009 | Bland | |
| 2009/0272221 A1 | 11/2009 | Long | |
| 2009/0272222 A1 | 11/2009 | Long | |
| 2011/0180517 A1 | 7/2011 | Schneider | |
| 2011/0248008 A1 | 10/2011 | Long | |
| 2011/0316516 A1 * | 12/2011 | Schiefermuller | B23K 9/32 |
| | | | 323/318 |
| 2012/0026996 A1 | 2/2012 | Yamaguchi | |
| 2012/0065972 A1 | 3/2012 | Strifler | |
| 2013/0091567 A1 | 4/2013 | Finch | |
| 2014/0014638 A1 * | 1/2014 | Artelsmair | B23K 9/0953 |
| | | | 219/130.01 |
| 2014/0027427 A1 | 1/2014 | Fosbinder | |
| 2014/0048522 A1 | 2/2014 | Dina | |

FOREIGN PATENT DOCUMENTS

| | | |
|---|---|---|
| CN | 101341755 | 1/2009 |
| CN | 101360580 | 2/2009 |
| CN | 102378666 | 3/2012 |
| CN | 102609123 | 7/2012 |
| DE | 19828986 | 12/1999 |
| EP | 0575082 | 12/1993 |
| EP | 0626635 | 11/1994 |
| EP | 1112800 | 7/2001 |
| EP | 1380377 A2 | 1/2004 |
| EP | 1586403 | 10/2005 |
| EP | 1635508 | 3/2006 |
| EP | 1681122 | 7/2006 |
| EP | 2131145 | 12/2009 |
| EP | 1683599 | 5/2014 |
| JP | 61137675 | 6/1986 |
| JP | 04162964 | 6/1992 |
| JP | 04162966 | 6/1992 |
| JP | 2001245174 | 9/2001 |
| JP | 2002054494 | 2/2002 |
| JP | 2003069911 | 3/2003 |

(56) References Cited

FOREIGN PATENT DOCUMENTS

| | | |
|---|---|---|
| JP | 2003088957 | 3/2003 |
| JP | 2003154455 | 5/2003 |
| JP | 2003191075 | 7/2003 |
| JP | 2003236663 | 8/2003 |
| JP | 2003236669 | 8/2003 |
| JP | 4017977 | 12/2007 |
| JP | 2011224661 | 11/2011 |
| JP | 2011255472 | 12/2011 |
| JP | 2013193091 | 9/2013 |
| KR | 20130001955 | 1/2013 |
| WO | 9958285 | 11/1999 |
| WO | 02085566 | 10/2002 |
| WO | 02086656 | 10/2002 |
| WO | 02095323 A1 | 11/2002 |
| WO | 03028389 | 1/2003 |
| WO | 2008060753 | 5/2008 |
| WO | 2010111722 | 10/2010 |
| WO | 2013184593 | 2/2013 |
| WO | 2013184589 | 12/2013 |

OTHER PUBLICATIONS

Avocent, "LongView Wireless User Guide", 2005, http://site.i-techcompany.com/DataSheet/Avocent/lv5800UG.pdf.

Echelon, "PL 3120 / PL 3150 Power Line Smart Transceiver Data Book," Version 2, 005-0154-01C.

Hackl et al., "Digitally Controlled GMA Power Sources," Fronius, www.fronius.com/worldwide/USA/products/paper_digitally_controlld_power_sources_gb.pdf, pp. 1-7, publication date not provided.

International Search Report for application No. PCT/US2010/045906 dated Nov. 29, 2010.

International Search Report from PCT application No. PCT/US2015/010252 dated Mar. 30, 2015, 9 pgs.

International Search Report from PCT application No. PCT/US2015/010257 dated Apr. 2, 2015, 9 pgs.

International Search Report from PCT application No. PCT/US2015/010258 dated Apr. 1, 2015, 9 pgs.

International Search Report from PCT application No. PCT/US2015/010264 dated Mar. 31, 2015, 8 pgs.

International Search Report from PCT application No. PCT/US2013/058099 dated Feb. 5, 2014, 12 pgs.

Wireless Universal Serial Bus Specification, Revision 1.0, May 12, 2005.

Uniarc Group, The Welding Torch Professionals, New Products Overview, 2010. 9 pages.

PulseMaster™ MIG Guns, Tweco Professional, 2007. 8 pages.

Ewm® MIG/MAG Welding Torches, EWM High Tech Welding GmbH, 2000. 12 pages.

\* cited by examiner

WELDING SYSTEM WITH MULTIPLE USER INTERFACE MODULES

CROSS-REFERENCE TO RELATED APPLICATION

This application claims priority from and the benefit of U.S. Provisional Application Ser. No. 61/697,993, entitled "WELDING SYSTEM WITH MULTIPLE USER INTERFACE MODULES," filed Sep. 7, 2012, which is hereby incorporated by reference in its entirety for all purposes.

BACKGROUND

The present invention relates generally to the field of welding systems, and more particularly to welding systems with multiple user interface modules that are synchronized.

In typical welding systems, user interface (UI) modules may appear in many locations. However, the UI modules may each display different sets of information at the different locations. In some cases, a UI module may even display outdated information. This disconnect of information within the system may result in conflicting settings, leading to operator confusion.

BRIEF DESCRIPTION

In one embodiment, a welding system user interface module includes a front panel comprising a first input device and a first display screen. The welding system user interface module also includes circuitry comprising a memory storing machine-readable instructions, a processor for executing the machine-readable instructions, and communication circuitry configured to receive UI data from the first input device or a second input device of a remote welding system user interface module, and to broadcast synchronized data to the first display screen and a second display screen of the remote welding system user interface module.

In another embodiment, a welding system includes a first user interface module located on a first welding system component, and a second user interface module located on a second welding system component. Data displayed by the first and second user interface modules is synchronized.

In another embodiment, a method includes receiving UI data from a first user interface module of a welding system or a second user interface module of the welding system. The method also includes broadcasting synchronized data to the first and second user interface modules based at least in part on the received UI data.

DRAWINGS

These and other features, aspects, and advantages of the present invention will become better understood when the following detailed description is read with reference to the accompanying drawings in which like characters represent like parts throughout the drawings, wherein.

Figure 1:
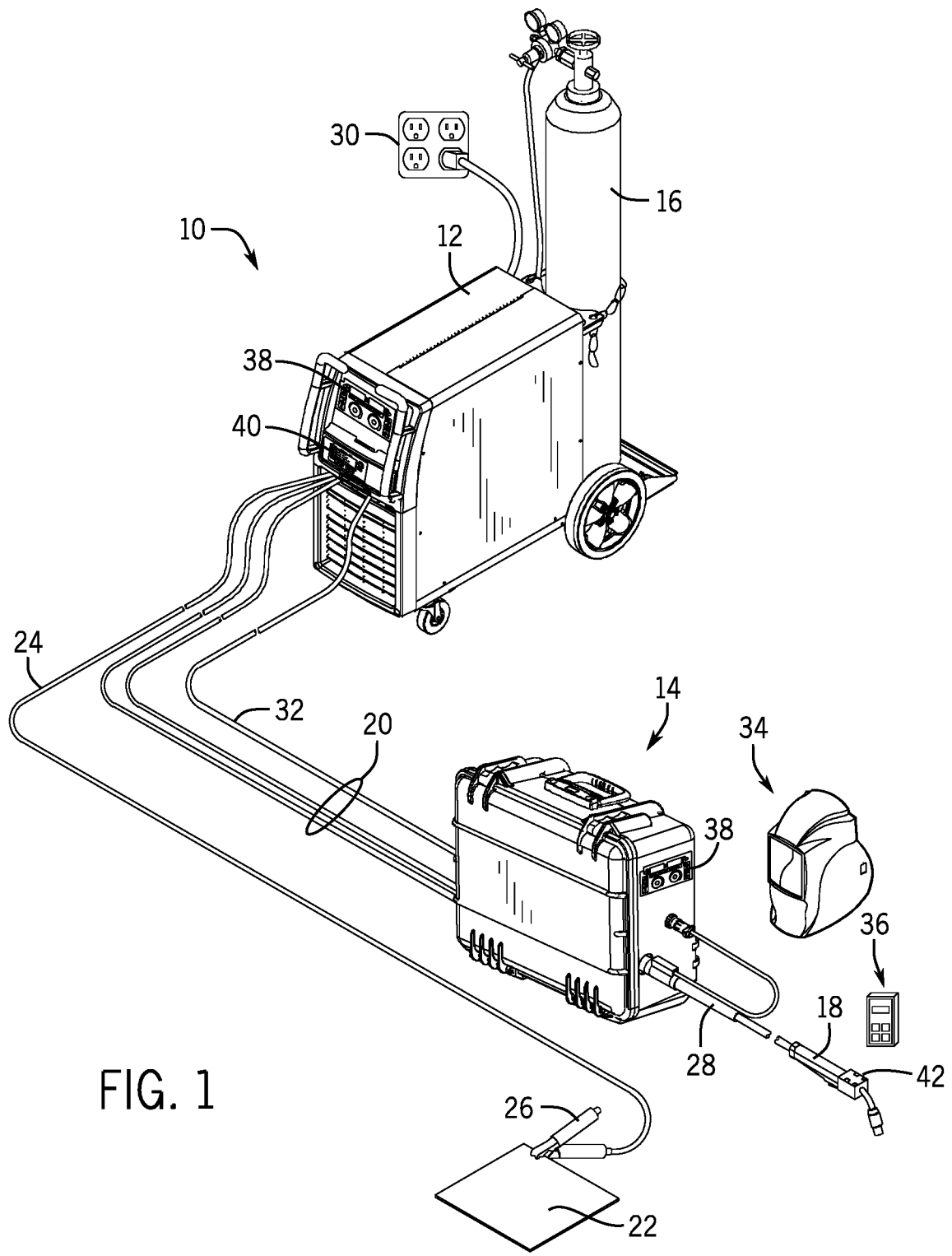
FIG. 1 is a diagram of an embodiment of a welding system that may utilize synchronized UI modules, in accordance with embodiments of the present disclosure.
Figure 6:
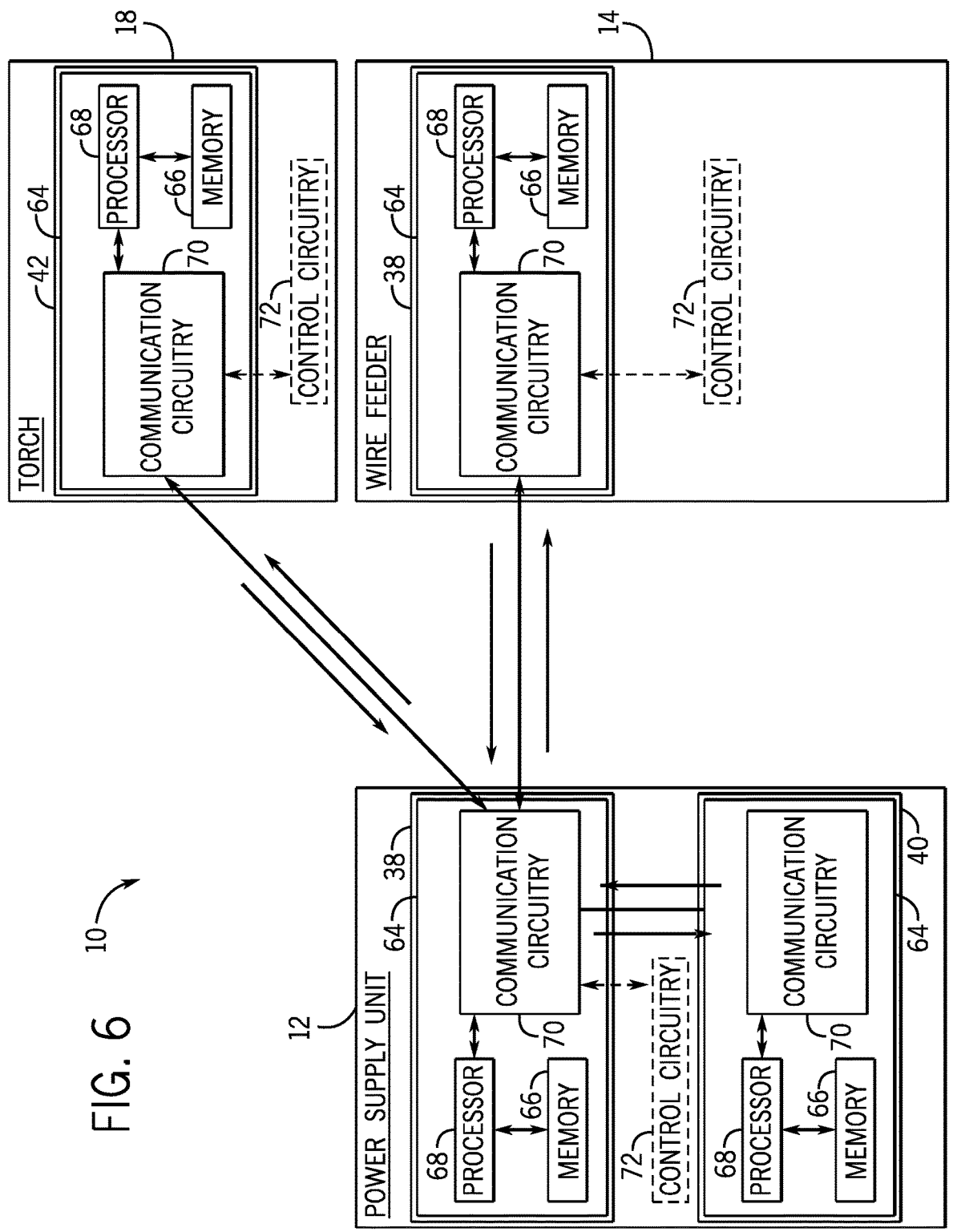
Figure 7:
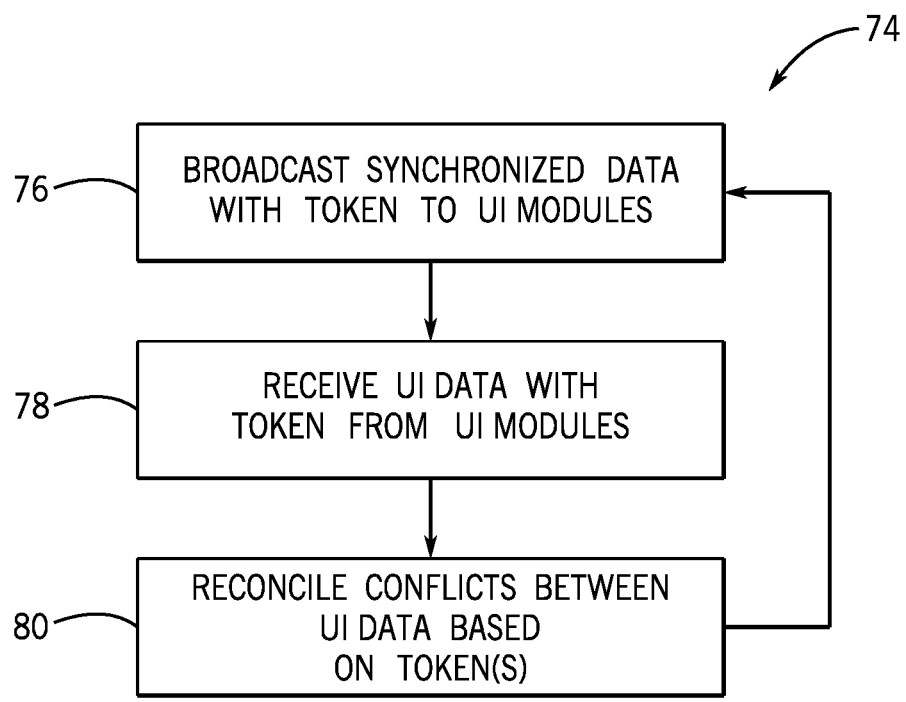

FIG. 6 is a block diagram of the welding power supply unit, the welding wire feeder, and the welding torch of FIG. 1, illustrating exemplary circuitry of the UI modules, in accordance with embodiments of the present disclosure; and FIG. 7 is a flow chart of an exemplary method of control used by the controlling UI module of the welding system of FIG. 6, in accordance with embodiments of the present disclosure.

DETAILED DESCRIPTION

The embodiments described herein include improvements to welding system user interface modules. Such improvements may provide consistent data throughout all UI modules in the system, resulting in synchronized data (e.g., relating to operating parameters of the various welding system components, parameters relating to the welding process as a whole, and so forth) being provided to all of the components for improved welding system operability. The UI modules enable an operator to adjust and monitor the inputs and outputs of the welding system, which may be received from and distributed to multiple locations in a welding environment. The welding system may include multiple UI modules on various components within the system, such as a welding power source, a welding wire feeder, a welding torch, a welding helmet, a welding remote device (e.g., a pendant), a welding cooling system, a personal computer (PC), and so forth. The UI modules may be specifically designed for the specific components for which they are designed. However, the UI modules may include certain types of UI modules that may be interchangeably (e.g., removable and replaceable) used between various components of a welding system. In addition, UI modules within a welding system may be synchronized such that the data are always relatively synchronized (e.g., within a given updating period, such as less than 1 millisecond) across the various UI modules. For example, as described in greater detail below, in certain embodiments, one of the UI modules in a welding system may always function as the synchronization module, receiving UI data (e.g., data relating to manipulation of input devices, data relating to changes in state for the particular UI module, data relating to changes in system states, and so forth) from the various UI modules within the welding system, and broadcasting synchronized data to the various UI modules.

Turning to the figures, FIG. 1 is a diagram of an embodiment of a welding system 10 that may utilize synchronized UI modules, in accordance with embodiments of the present disclosure. It should be appreciated that, while the welding system 10 described herein is specifically presented as a gas metal arc welding (GMAW) system 10, the presently disclosed synchronized UI modules may also be used with other arc welding processes (e.g., FCAW, FCAW-G, GTAW, SAW, SMAW, or similar arc welding processes). More specifically, as described in greater detail below, all equipment and accessories used in the welding system 10 may include the synchronized UI modules described herein. The welding system 10 includes a welding power supply unit 12 (i.e., a welding power source), a welding wire feeder 14, a gas supply system 16, and a welding torch 18. The welding power supply unit 12 generally supplies power to the welding system 10 and other various accessories, and may be coupled to the welding wire feeder 14 via a weld cable 20 as well as coupled to a workpiece 22 using a lead cable 24 having a clamp 26. In the illustrated embodiment, the welding wire feeder 14 is coupled to the welding torch 18 via a weld cable 28 in order to supply welding wire and power to the welding torch 18 during operation of the welding system 10. In another embodiment, the welding power supply unit 12 may couple and directly supply power to the welding torch 18.

In the embodiment illustrated in FIG. 1, the welding power supply unit 12 may generally include power conversion circuitry that receives input power from an alternating current power source 30 (e.g., the AC power grid, an engine/generator set, or a combination thereof), conditions the input power, and provides DC or AC output power via the weld cable 20. As such, the welding power supply unit 12 may power the welding wire feeder 14 that, in turn, powers the welding torch 18, in accordance with demands of the welding system 10. The lead cable 24 terminating in the clamp 26 couples the welding power supply unit 12 to the workpiece 22 to close the circuit between the welding power supply unit 12, the workpiece 22, and the welding torch 18. The welding power supply unit 12 may include circuit elements (e.g., transformers, rectifiers, switches, and so forth) capable of converting the AC input power to a direct current electrode positive (DCEP) output, direct current electrode negative (DCEN) output, DC variable polarity, or a variable balance (e.g., balanced or unbalanced) AC output, as dictated by the demands of the welding system 10 (e.g., based on the type of welding process performed by the welding system 10, and so forth).

The illustrated welding system 10 includes a gas supply system 16 that supplies a shielding gas or shielding gas mixtures to the welding torch 18. In the depicted embodiment, the gas supply system 16 is directly coupled to the welding torch 18 via a gas conduit 32 that is part of the weld cable 20 from the welding power supply unit 12. In another embodiment, the gas supply system 16 may instead be coupled to the welding wire feeder 14, and the welding wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

In addition, in certain embodiments, other welding equipment and welding accessories (e.g., welding-related devices) may be used in the welding system 10. For example, in most welding applications, a welding helmet 34 may be worn by an operator of the welding system 10. The welding helmet 34 provides protection to the operator of the welding system 10, particularly protecting the eyes of the operator from the flashing associated with the welding arc during welding operations. In addition, in certain embodiments, the welding helmet 34 may provide feedback to the operator related to parameters of the welding operations. For example, the welding helmet 34 may include an internal display configured to display the welding parameters to the operator during the welding operations. In addition, in certain embodiments, a welding remote device (e.g., a pendant) 36 may be used to communicate between the welding wire feeder 14 and the welding torch 18. The welding remote device 36 is a device that may be used at a welding application remote from an associated welding power supply unit 12 and/or welding wire feeder 14, yet still provide substantially the same display and input devices that the remote welding power supply unit 12 and/or welding wire feeder 14 provide. In other words, the welding remote device 36 may be used as a remote control panel when it is not feasible or practical to use control panels on an associated remote welding power supply unit 12 and/or welding wire feeder 14.

Figure 2:
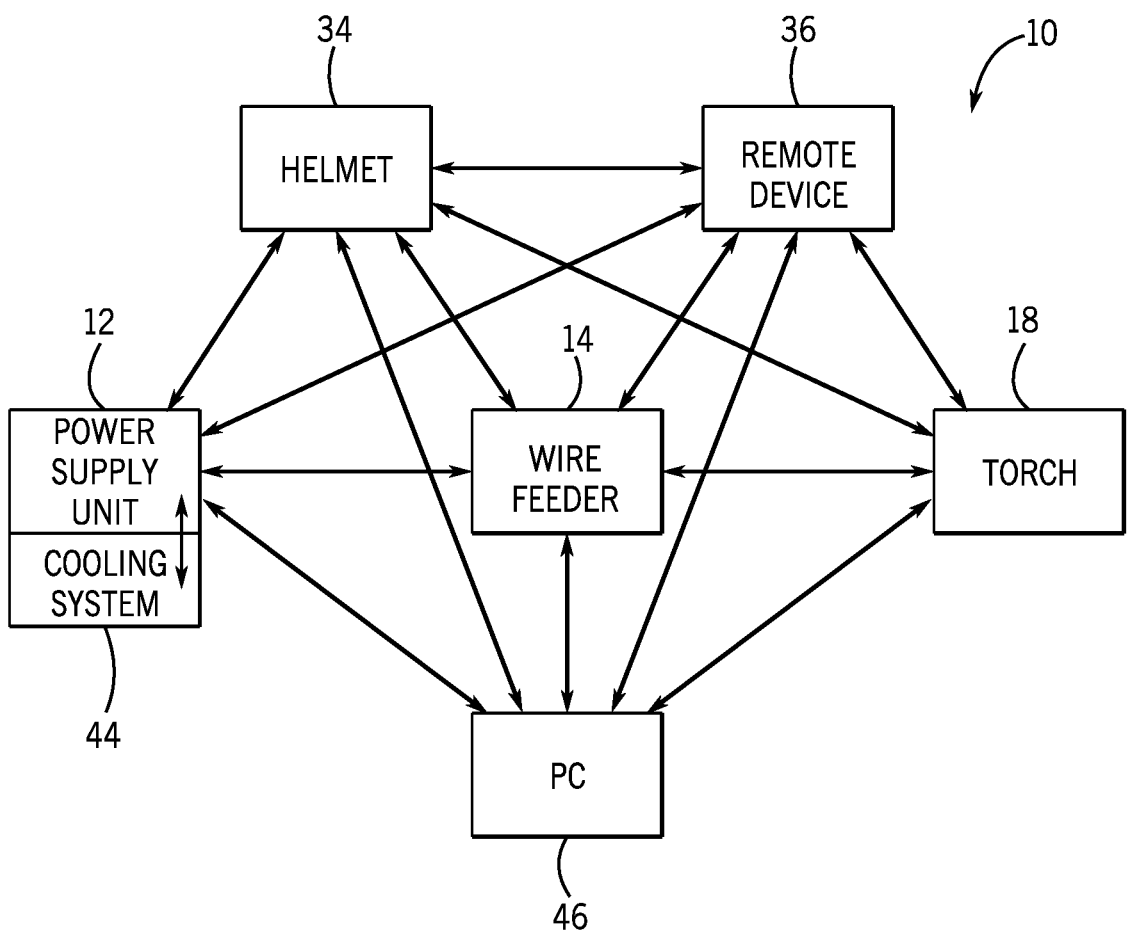
FIG. 2 is a block diagram of an exemplary welding system including various welding equipment and accessories, in accordance with embodiments of the present disclosure.

The welding equipment and accessories illustrated in FIG. 1 are merely exemplary and not intended to be limiting of the types of welding equipment and accessories that may be used in the welding system 10 and include synchronized UI modules as described herein. Many other types of welding equipment and accessories (e.g., welding cooling systems, personal computers (PCs), and so forth) may also be used in conjunction with the welding system 10 and include synchronized UI modules as described herein. As will be appreciated, welding systems 10 may sometimes become somewhat complex with the number of welding equipment and accessories that are included in the welding systems 10. For example, FIG. 2 is a block diagram of an exemplary welding system 10 including various welding equipment and accessories, including a welding power supply unit 12, a wire feeder 14, a welding torch 18, a welding helmet 34, and welding remote device 36, a welding cooling system 44, and a personal computer (PC) 46, in accordance with embodiments of the present disclosure. As will be appreciated, each of the welding system components of FIG. 2 may be configured to receive one or more of the UI modules 38, 40, 42 in specific locations. For example, as illustrated in FIG. 1, the welding power supply unit 12 may be configured to receive an upper UI module 38 in an upper front panel, and to receive a lower UI module 40 in a lower front panel. Similarly, the welding wire feeder 14 may be configured to receive an upper UI module 38 in a front panel. The welding torch 18 may be configured to receive a torch UI module 42 in a top body portion. In certain embodiments, the welding helmet 34 may be configured to receive one of the UI modules 38, 40, 42 in an interior portion of the welding helmet 34 to enable the operator to view the information. In other embodiments, a UI module may be specifically designed (e.g., having different functionality than any of the UI modules 38, 40, 42) for use within the interior portion of the welding helmet 34. The welding remote device 36 may be configured to receive one of the UI modules 38, 40, 42 (or a UI module specific designed for the welding remote device 36) in a front panel. Returning now to FIG. 2, the welding cooling system 44 and the PC 46 may be configured to receive one of the UI modules 38, 40, 42 in a front panel.

As illustrated in FIG. 2, the communication paths between the various welding equipment and accessories can become somewhat complex. In particular, any number and combination of the welding system components of FIG. 2 may be used together. The synchronized UI modules described herein facilitate synchronized communication of data between such welding equipment and accessories. More specifically, as described above, the embodiments described herein provide synchronized UI modules that may be specifically designed for the specific welding equipment and accessories for which they are designed. However, the UI modules are interchangeable (e.g., are removable and replaceable) between certain welding equipment and accessories. For example, returning now to FIG. 1, for purposes of illustration herein, the illustrated welding system 10 includes an upper UI module 38, a lower UI module 40, and a torch UI module 42, each of which may have specific input devices and display devices for the specific type of UI module. For instance, the torch UI module 42 is specifically designed for welding torches such as the welding torch 18 illustrated in FIG. 1 and, as such, may generally include a smaller physical profile having fewer and more streamlined input devices and display screens than, for example, the upper and lower UI modules 38, 40. As also illustrated in FIG. 1, both the welding power supply unit 12 and the welding wire feeder 14 include upper UI modules 38, whereas only the welding power supply unit 12 includes a lower UI module 40. However, in other embodiments, the welding wire feeder 14 may be configured to receive a lower UI module 40 instead of an upper UI module 38, or may be configured to receive both an upper UI module 38 and a lower UI module 40. It will be appreciated that the UI modules 38, 40, 42 illustrated in FIG. 1 are merely exemplary and not intended to be limiting. Other types of synchronized UI modules may be used.

Figure 3:
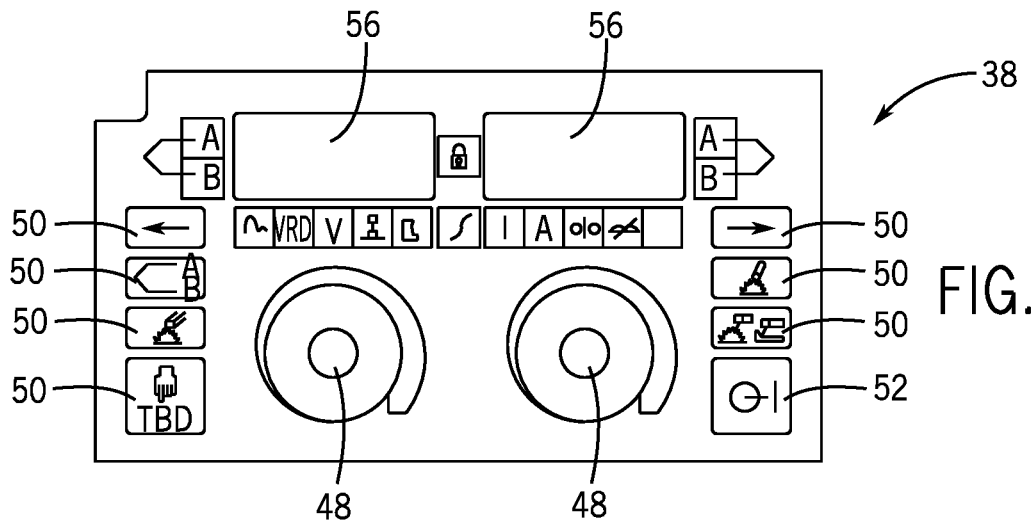
FIG. 3 is a front view of the upper UI module, in accordance with embodiments of the present disclosure.
Figure 4:
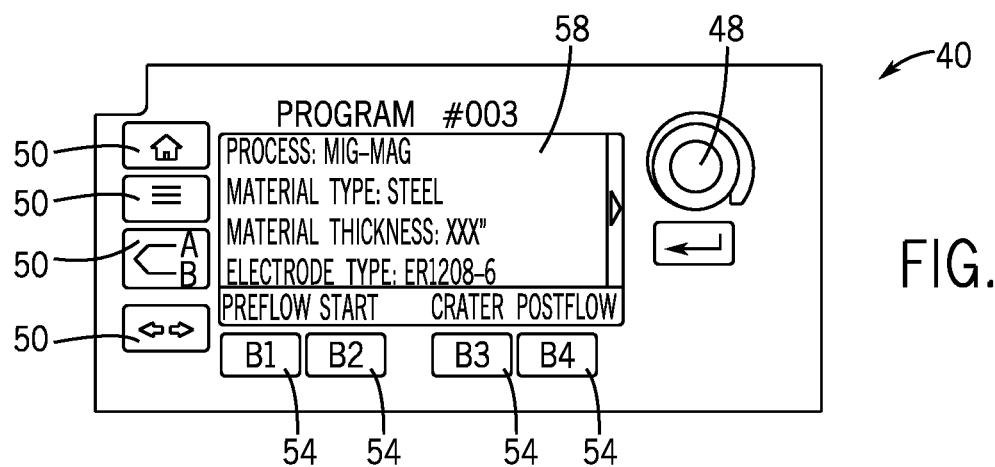
FIG. 4 is a front view of the lower UI module, in accordance with embodiments of the present disclosure.
Figure 5:
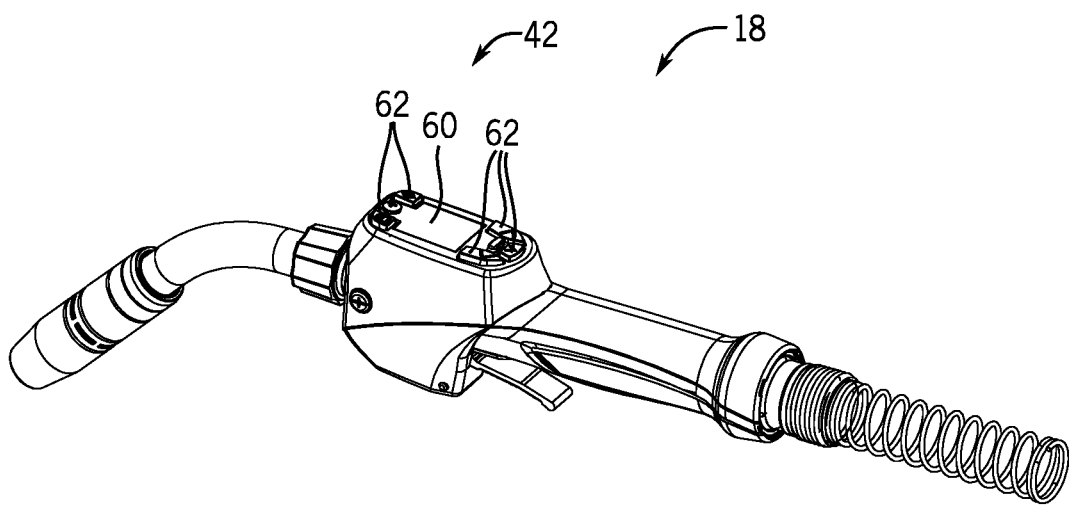
FIG. 5 is a perspective view of the welding torch of FIG. 1 having the torch UI module, in accordance with embodiments of the present disclosure.

As described above, the UI modules 38, 40, 42 may include different input devices and display screens (e.g., plasma panels, LCDs panels, LED panels, and so forth), which generally depend upon the general functionality of the welding equipment or accessory for which the UI module is used. For example, FIG. 3 is a front view of the upper UI module 38, FIG. 4 is a front view of the lower UI module 40, and FIG. 5 is a perspective view of the welding torch 18 of FIG. 1 having the torch UI module 42, in accordance with embodiments of the present disclosure. As illustrated, the upper UI module 38 generally includes more input devices than the lower UI module 40. For example, the upper UI module 38 includes two control knobs 48, whereas the lower UI module 40 only includes one control knob 48. These control knobs 48 may be used to control parameters of the welding process, such as voltage, current, wire feed speed, welding wire diameter, and so forth. Similarly, the upper UI module 38 includes considerably more control buttons 50, which may be used to modify operating modes, modes of information display, and so forth. Furthermore, the upper UI module 38 includes a power button 52, which may be used to turn the respective welding equipment of accessory on or off, whereas the lower UI module 40 does not include a power button 52. However, the lower UI module 40 includes memory buttons 54 that may be used to store certain operation profiles (e.g., a certain memory profile may include a given set of operating parameters, such as voltage, current, wire feed speed, welding wire diameter, and so forth). The displays are also somewhat different between the upper UI module 38 and the lower UI module 40. In certain embodiments, the display screens 56 of the upper UI module 38 may be display screens for displaying operating parameters (e.g., voltage, current, wire feed speed, welding wire diameter, and so forth) as they change during operation of the welding system 10, and the display screen 58 of the lower UI module 40 may be a display screen (e.g., touch screen) that may be scrolled through by the operator to view various information of the welding system 10.

In contrast to the upper and lower UI modules 38, 40, the torch UI module 42 illustrated in FIG. 5 includes a relatively smaller display screen 60 (e.g., plasma, LCD, LED, touch, etc.). The torch UI module 42 may include control buttons 62 (e.g., soft keys, hard buttons, knobs, etc.). As will be appreciated, the functionality of these control buttons 62 may be relatively simpler than that of either the upper UI module 38 or the lower UI module 40. However, the torch UI module 42 may enable the operator to adjust system parameters quickly (e.g., without having to walk over to the welding power supply unit 12 or the welding wire feeder 14), resulting in more efficient welding processes.

All of the various input devices (e.g., the control knobs 48, the control buttons 50, the power buttons 52, the memory buttons 54, the control buttons 62, and so forth), as well as various other input devices that may be included in the UI modules 38, 40, 42, may be used to receive user inputs from the operator from the various welding equipment and accessories to which the UI modules 38, 40, 42 are attached. In addition, as described in greater detail below, the various display screens 56, 58, 60 may display information that has been synchronized between the various UI modules 38, 40, 42. The operator may change and/or view any of the welding system settings from any of the UI modules 38, 40, 42 in the welding system 10. As such, the UI hardware, software, and data may be duplicated at every UI module 38, 40, 42 in the welding system 10. Therefore, each UI module 38, 40, 42 may display the same information, and only one set of data may need to be managed and relayed to each UI module 38, 40, 42. Using duplicated data at each UI module 38, 40, 42 may result in synchronized data throughout the welding system 10, reducing the possibilities for mistakes and/or confusion. Furthermore, the welding system 10 may be able to receive input information at multiple locations and have the information recognized across the entire welding system 10 immediately (e.g., within a given updating period, such as every 100 milliseconds). Additionally, the synchronization mechanism may enable locking and/or limiting of system parameters, improving the security of the welding system 10.

FIGS. 3-5 primarily illustrate the outwardly-facing front panels of the UI modules 38, 40, 42. However, each of the UI modules 38, 40, 42 includes its own circuit board that includes circuitry for processing UI data (including data relating to user manipulation of user input devices) from their respective input devices, communicating information relating to the UI data among the various UI modules 38, 40, 42, receiving updated (e.g., synchronized) data relating to operation of the welding process, displaying the received data on their respective display screen(s), and so forth. In general, one of the UI modules 38, 40, 42 will be used as a controlling UI module. In other words, one of the UI modules 38, 40, 42 will be used to receive information relating to the UI data from all of the UI modules 38, 40, 42 of the welding system 10, and to communicate updated (e.g., synchronized) data relating to operation of the welding system 10 to the various UI modules 38, 40, 42, thereby synchronizing operation of the various UI modules 38, 40, 42. In general, the UI modules 38, 40, 42 include substantially similar hardware and/or software, such that any one of the UI modules 38, 40, 42 could be used as the controlling UI module. It will be appreciated that selection of a specific UI module 38, 40, 42 as the controlling module may be selected via the input devices of the various UI modules 38, 40, 42.

FIG. 6 is a block diagram of the welding power supply unit 12, the welding wire feeder 14, and the welding torch 18 of FIG. 1, illustrating exemplary circuitry of the UI modules 38, 40, 42, in accordance with embodiments of the present disclosure. In the illustrated embodiment, the upper UI module 38 of the welding power supply unit 12 is being used as the controlling UI module. More specifically, the upper UI module 38 of the welding power supply unit 12 receives UI data from the lower UI module 40 of the welding power supply unit 12, the upper UI module 38 of the welding wire feeder 14, and the torch UI module 42 of the welding torch 18, and broadcasts synchronized data to the lower UI module 40 of the welding power supply unit 12, the upper UI module 38 of the welding wire feeder 14, and the torch UI module 42 of the welding torch 18, as well as updating its own input device(s) and display screen(s) with the synchronized data. However, again, any one of the UI modules 38, 40, 42 could be selected as the controlling UI module insofar as each of the UI modules 38, 40, 42 includes substantially similar hardware and/or software, enabling each to function as the controlling UI module in the manner the upper UI module 38 is functioning in FIG. 6.

For example, as illustrated in FIG. 6, each of the UI modules 38, 40, 42 includes a circuit board 64 that includes a memory 66, a processor 68, and communication circuitry 70. As described herein, in general, each of the UI modules 38, 40, 42 includes only a single circuit board 64 that is associated with certain input devices and/or display screens. However, in certain embodiments, a composite UI module may be used, which includes a first UI module that includes certain input devices and/or display screens and a first circuit board 64 that includes its own memory 66, processor 68, and communication circuitry 70, and a second UI module that includes certain input devices and/or display screens and a second circuit board 64 that includes its own memory 66, processor 68, and communication circuitry 70.

Each of the UI modules 38, 40, 42 includes machine-readable instructions stored in the respective memory 66 that may be executed by the respective processor 68. The machine-readable instructions of the controlling UI module (the upper UI module 38 of the welding power supply unit 12 in FIG. 6) determines the synchronized data to be broadcast to the other UI modules 38, 40, 42 of the welding system 10 based at least on UI data received from the UI modules 38, 40, 42 of the welding system 10. The synchronized data that is broadcast may be determined at least in part on data that is communicated to/from control circuitry 72 that is internal to the welding system component (the welding power supply unit 12 in FIG. 6) on which the controlling UI module is located. Indeed, the communication circuitry 70 of each of the UI modules 38, 40, 42 may be configured to communicate with control circuitry 72 that is internal to (e.g., within a housing of) the welding system component on which the UI module 38, 40, 42 is located, either wirelessly or via communication ports on the respective circuit board 64 that are configured to mate with complementary ports in the respective welding system component. It will be appreciated that certain welding system components (e.g., the welding torch 18) may not include such internal control circuitry 72 in certain embodiments.

The communication circuitry 70 of the UI modules 38, 40, 42 may similarly include either wireless or wired communication circuitry for communicating between the UI modules 38, 40, 42. For example, in certain embodiments, the communication circuitry 70 may use Ethernet, RS485, RS232, SPI, fiber optics, RF, or any other suitable communication methods to communicate the UI data and the synchronized data between the UI modules 38, 40, 42. In addition, in certain embodiments, the UI modules 38, 40, 42 may also communicate (e.g., via WiFi or other suitable communication techniques) with a personal computer (PC) (e.g., the PC 46 illustrated in FIG. 2), tablet computer, smart phone, and so forth, to provide a virtual user interface to a remote operator. Furthermore, in certain embodiments, the synchronized data may be communicated across different communication technologies, and be formatted accordingly. Use of these communication methods may enable the welding system components to communicate quickly, and may provide increased welding system security from unauthorized users.

FIG. 7 is a flow chart of an exemplary method 74 of control used by the controlling UI module (e.g., the upper UI module 38 of the welding power supply unit 12 of FIG. 6) of the welding system 10, in accordance with embodiments of the present disclosure. In step 76, the controlling UI module broadcasts synchronized data to the UI modules 38, 40, 42 of the welding system 10, wherein the synchronized data includes a broadcast token embedded therein. In step 78, the controlling UI module receives UI data from input devices of the UI modules 38, 40, 42 of the welding system 10, wherein the UI data includes a response token embedded therein. The response tokens are generally related to the broadcast tokens. For example, the response tokens may match the broadcast tokens, or may be related to (e.g. may include a counter, be an inverse, and so forth) the broadcast tokens. In step 80, the controlling UI module reconciles conflicts between UI data based on the tokens, which may include timestamps, counters, or a combination thereof. For example, a first user input command (e.g., via manipulation of a user input device) received from one UI module 38, 40, 42 may occur at substantially the same time as a second user input command (e.g., via manipulation of a user input device) received from another UI module 38, 40, 42. Based at least in part on the response tokens that are embedded within the potentially conflicting user input commands, the controlling UI module determines which of the user input commands should take priority, whether both user input commands should be implemented, and so forth. This determination may be made based at least in part on communication with the control circuitry 72 internal to the welding system component on which the controlling UI module is located. In addition, the reconciliation of the UI data (e.g., user input commands) may be determined by an arc controller (e.g., system root), which may be internal to one of the welding system components. Furthermore, in certain embodiments, the reconciliation of the UI data (e.g., user input commands) may also include prioritization of the UI data (e.g., user input commands). For example, a prioritization between the UI data may be based on the types of the UI modules 38, 40, 42 (e.g., certain types of UI modules 38, 40, 42 may be given higher prioritization), the type of welding system component on which the UI module 38, 40, 42 is located (e.g., certain types of welding system components may be given higher prioritization), a location of the UI module 38, 40, 42 (e.g., based on a network address), and so forth, each of which may be embedded within the response tokens. Once the potentially conflicting UI data (e.g., user input commands) are reconciled by the controlling UI module, the method continues back to step 76 where the controlling UI module again broadcasts synchronized data to the UI modules 38, 40, 42 of the welding system 10.

As described above, each cycle of the method 74 may be performed by the controlling UI module at a given time interval (e.g., at least approximately every second, at least approximately every 100 milliseconds, at least approximately every 50 milliseconds, at least approximately every 10 milliseconds, at least approximately every 1 millisecond, or even more frequently). However, in certain embodiments, the rate at which the synchronized data is re-broadcast will change over time. For example, the rate at which the synchronized data is re-broadcast may be reduced when there are no new changes to the synchronized data (e.g., when the broadcast token stays the same between cycles). However, when a change in the synchronized display data occurs (e.g., due to system behavior or new control values), the re-broadcast time is momentarily sped up to ensure that each receiving display node (e.g., the UI modules 38, 40, 42) receives the update more rapidly. The broadcast rate reduction logic reduces the total number of network messages that the UI modules 38, 40, 42 have to process. For example, in certain embodiments, three broadcast display data messages including the synchronized data may be sent within approximately 1 millisecond (e.g., approximately 400 microseconds apart), and then the broadcast rate reduces to only once every 50 milliseconds (e.g., a baseline broadcast rate). In certain embodiments, the broadcast rate can also be increased while actively welding (e.g., from approximately 50 milliseconds to approximately 10 milliseconds or approximately 20 milliseconds). As such, the controlling UI module of the welding system 10 may vary the broadcast rate to optimize network performance and to ensure prompt display updates. In particular, the broadcast rate may be varied based on single occurrences or frequencies of occurrences of changes caused by, for example, manual changes via the input devices of the UI modules 38, 40, 42 and/or automatic changes such as system state or feedback changes.

The modularity of the UI modules 38, 40, 42 described herein enables relatively complex welding systems, such as the welding system 10 illustrated in FIG. 2, to provide appropriate types of synchronized data with minimal types of interchangeable UI modules 38, 40, 42. For example, as illustrated in FIG. 6, the welding power supply unit 12 may include system root control circuitry 72 that enables it to function as a network master and to control data management and automation of the welding system 10. The control circuitry 72 may have no input devices or display screens, however, the welding power supply unit 12 may include both a "basic UI" (e.g., the upper UI module 38) and an "advanced LCD UI" (e.g., the lower UI module 40). In addition, the welding wire feeder 14 may include control circuitry 72 that provides basic local control functionality for the welding wire feeder 14 and the "basic UI" (e.g., the upper UI module 38). In addition, as described above, the welding torch 18 may include a "specialized LCD UI" (e.g., the torch UI module 42). Returning to FIG. 2, the welding helmet 34 may include a specialized UI module in an interior portion of the welding helmet 34. The welding remote device 36 may include the "basic UI" (e.g., the upper UI module 38), the "advanced LCD UI" (e.g., the lower UI module 40), or a specialized UI module. Similarly, the welding cooling system 44 and the PC 46 may include the "basic UI" (e.g., the upper UI module 38), the "advanced LCD UI" (e.g., the lower UI module 40), or a specialized UI module. Other types of welding system components, such as a diagnostics service tool and simple accessories (e.g., foot pedals and hand controls) may include simple specialized UI modules with reduced functionality.

Furthermore, in certain embodiments, remote control nodes may be used that include no display screens or input devices, but nevertheless may receive and apply the synchronized data that is broadcast by the controlling UI module. Such remote control nodes may still be capable of sending data to the controlling UI module. For example, a current or temperature sensor may function as a remote control node, and may send control messages to the controlling UI module, and receive the synchronized data as control values or state changes. In addition, automation or programmable logic controllers (PLCs) may use the same UI synchronization messages (e.g., in the synchronized data) to automatically adjust settings as a sequence of welded parts are changed, for example.

As described above, the modularity and interchangeability of the UI modules 38, 40, 42 described herein enable virtually unlimited combinations of UI functionality. Again, it should be noted that the UI hardware, software, and even the data communicated, of the UI modules 38, 40, 42 are substantially identical, enabling each of the UI modules 38, 40, 42 to function as a controlling UI module or simply a node in the communication network of welding components of the welding system 10. In addition, all of the UI modules 38, 40, 42 will have the same look and feel as well as data management style. However, each of the UI modules 38, 40, 42 may individually display, at the same time, the exact same parameters, some of the same parameters and some different parameters, or entirely different parameters, depending on the specific needs of the particular UI modules 38, 40, 42. For all UI modules 38, 40, 42 that are displaying the same parameters, they match and are synchronized. For example, if one display screen changes a parameter that is on other display screens, the other display screens update as the parameter changes. For all UI modules 38, 40, 42 that are displaying parameters that are not currently on other UI modules 38, 40, 42, some parameters may be edited with no affect to the other UI modules. In certain embodiments, all of the upper UI modules 38 may display exactly the same parameters. For example, if a change is made to what is being displayed on one upper UI module 38, all of the upper UI modules 38 will be updated to match what is being displayed. Conversely, all of the lower UI modules 40 display may be independent from each other, and display the same or different parameters. For example, if a change is made to what is being displayed on one lower UI module 40, the other lower UI modules 40 may not necessarily follow (e.g., the data displayed may be synchronized, but the particular parameters being displayed may not be). It will be understood that any grouping of UI modules 38, 40, 42 may have differing functionality. For example, in other embodiments, the upper UI modules 38 may potentially display different parameters, while the lower UI modules 40 may display exactly the same parameters. The parameter values themselves, however, will always be synchronized regardless of the UI module 38, 40, 42 upon which they are displayed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding system, comprising:
an interface comprising a first display screen and a first input device configured to receive first inputs from an operator to adjust one or more welding system parameters;
communication circuitry configured to receive, from a remote welding system user interface module, second inputs to adjust the one or more welding system parameter settings;
processing circuitry; and
a memory storing machine-readable instructions, which, when executed by the processing circuitry, cause the processing circuitry to:
synchronize the one or more welding system parameter settings received from the first inputs and the second inputs; and
transmit the synchronized welding system parameter settings to the first display screen and a second display screen of the remote welding system user interface module.
2. The welding system of claim 1, wherein the machine-readable instructions comprise instructions for reconciling conflicts between welding system parameter settings received from the first and second input devices.

3. The welding system of claim 2, wherein the synchronized welding system parameter settings comprises a broadcast token, and the second inputs are associated with a response token, wherein reconciliation of the conflicts between the first inputs and the second inputs is based at least in part on the broadcast token and the response token.

4. The welding system of claim 3, wherein the response token comprises prioritization information.

5. The welding system of claim 1, wherein the communication circuitry is configured to communicate with control circuitry internal to a welding system component.

6. The welding system of claim 1, wherein the welding system user interface module is removable and replaceable from a welding system component.

7. The welding system of claim 1, wherein the communication circuitry comprises wireless communication circuitry configured to communicate with the remote welding system user interface module wirelessly.

8. The welding system of claim 1, wherein the communication circuitry is configured to broadcast the synchronized welding system parameter settings at least approximately every 100 millisecond.

* * * * *